United States Patent
Ren et al.

(10) Patent No.: US 11,105,194 B2
(45) Date of Patent: Aug. 31, 2021

(54) PROBE FOR EXCAVATION-FREE GUIDANCE INSTRUMENT

(71) Applicant: Underground Magnetics, Inc., Johnston, IA (US)

(72) Inventors: Chao Ren, Urbandale, IA (US); Changping Ge, Ningbo (CN); Xiangxiang Jin, Ningbo (CN)

(73) Assignee: Underground Magnetics, Inc., Johnston, IA (US)

(*) Notice: Subject to any disclaimer, the term of this patent is extended or adjusted under 35 U.S.C. 154(b) by 0 days.

(21) Appl. No.: 16/340,828

(22) PCT Filed: Jan. 30, 2019

(86) PCT No.: PCT/CN2019/073868
§ 371 (c)(1),
(2) Date: Apr. 10, 2019

(87) PCT Pub. No.: WO2019/157957
PCT Pub. Date: Aug. 22, 2019

(65) Prior Publication Data
US 2021/0054729 A1   Feb. 25, 2021

(30) Foreign Application Priority Data
Feb. 13, 2018   (CN) .......................... 201820256772.5

(51) Int. Cl.
*G01V 3/28* (2006.01)
*E21B 47/024* (2006.01)
*E21B 7/04* (2006.01)

(52) U.S. Cl.
CPC ............ *E21B 47/024* (2013.01); *E21B 7/046* (2013.01); *G01V 3/28* (2013.01)

(58) Field of Classification Search
CPC .......................... G01R 1/067; G01R 1/06788; G01R 31/2808; G01R 31/2886; G01R 31/2889;
(Continued)

(56) References Cited

U.S. PATENT DOCUMENTS 2,978,637 A * 4/1961 Price .................... G01N 27/205
324/559
5,560,437 A * 10/1996 Dickel ................... E21B 47/13
175/40
(Continued)

FOREIGN PATENT DOCUMENTS

CN    201496063 U    6/2010
CN    103336309 A    10/2013
(Continued)

OTHER PUBLICATIONS

International Search Report dated Apr. 12, 2019 for PCT/CN2019/073868.

*Primary Examiner* — Jermele M Hollington
*Assistant Examiner* — Taqi R Nasir
(74) *Attorney, Agent, or Firm* — Mallory M. Henninger; Advent, LLP

(57) ABSTRACT

A probe for a non-excavation guide can include an outer casing and a transmitting antenna. The transmitting antenna can be disposed in the outer casing, with the transmitting antenna including a magnetic core and a coil. The magnetic core can include a plurality of magnetic core segments. The magnetic core segments can be annular in shape and thereby define a hollow segment interior. The magnetic core segments can be sequentially arranged within the outer casing, with the coil located around an outside of the plurality of magnetic core segments. The probe assembly can facilitate the manufacture of the magnetic cores, reduce the disposi-
(Continued)

tion of insulating members, facilitate the assembly of the transmitting antenna, and/or reduce production costs.

19 Claims, 2 Drawing Sheets

(58) Field of Classification Search
CPC .... G01R 1/07; G01R 31/307; G01R 1/07342; G01V 3/28; E21B 47/024; E21B 7/046
See application file for complete search history.

(56) References Cited

U.S. PATENT DOCUMENTS

| | | | |
|---|---|---|---|
| 7,026,813 B2 * | 4/2006 | Homan | G01V 3/28 |
| | | | 324/247 |
| 7,111,693 B1 | 9/2006 | Works | |
| 2017/0292365 A1 * | 10/2017 | Khapochkin | E21B 47/024 |

FOREIGN PATENT DOCUMENTS

| | | |
|---|---|---|
| CN | 203822289 U | 9/2014 |
| CN | 104373112 A | 2/2015 |
| CN | 105277236 A | 1/2016 |
| CN | 104373112 B | 12/2016 |
| CN | 105277236 B | 2/2018 |
| CN | 108708693 A | 10/2018 |
| CN | 208010332 U | 10/2018 |
| CN | 108708693 B | 3/2019 |

* cited by examiner

PROBE FOR EXCAVATION-FREE GUIDANCE INSTRUMENT

RELATED APPLICATIONS

The present application is a US national stage filing based on PCT/CN2019/073868, filed on Jan. 30, 2019, which claims priority to Chinese Utility Model Application No. CN201820256772.5, filed Feb. 13, 2018, which was granted as Chinese Utility Model No. CN 208010332 U on Oct. 26, 2018.

TECHNICAL FIELD

The present disclosure relates to an excavation-free guidance instrument, in particular a probe for an excavation-free guidance instrument.

BACKGROUND

As urban construction develops on a large scale, it can be necessary to lay interceptor sewers or pipes for supplying energy (liquefied gas, natural gas, etc.) within cities. A commonly used method is to dig a trench to lay pipes and lines, but this can cause environmental pollution and/or traffic jams and may involve construction hazards.

For this reason, excavation-free pipe-laying technology has also been developed and put into use at the present time. This is a construction technique in which underground pipelines are laid, repaired and replaced using rock-and-soil drilling and tunnelling methods, without digging trenches in the road surface or destroying large areas of the surface layer of ground. The use of excavation-free technology has advantages such as a short cycle, low costs, little pollution and a good level of safety. The technology may also have no impact on normal traffic order.

Amongst excavation-free pipe-laying techniques, the horizontal guided advance method is widely used. This method is realized using an excavation-free guidance instrument to guide the directional advance of a drill rod equipped with a drill bit. The excavation-free guidance instrument can include the provision of a real-time drill bit operating conditions, such as depth, angle of inclination and clock face direction. Such real-time operating conditions can enable operators on the ground to ascertain in real time the path taken by the hole being drilled in order to correct subsequent operations promptly, so as to help ensure the precise orientation of a set route path and accomplish the excavation-free laying of pipes.

Excavation-free guidance instruments have been applied widely due to the fact that the wireless structure therein is simple and convenient. The instrument system can include an underground probe, an above-ground tracking receiver and a synchronous display. Through the use of a signal sent by the probe mounted on an underground drill bit, the tracking receiver can be operated by an operator on the ground. After determining a vertical placement point of the drill bit relative to the ground surface, the operating condition of the drill bit can be obtained on the basis of radio information transmitted by the probe at that point and received by the tracking receiver.

In the process of excavation-free guided construction, the probe of the guidance system is mounted in a probe housing of the drill bit. The probe moves in a stratum together with the drill bit, measures spatial position information of the drill bit in real time, and sends this signal to a surface receiving apparatus. The operator on the ground can determine deviation of the actual path of movement of the drill bit from a design path according to the spatial position of the drill bit measured by the underground probe, and thereby send an instruction to a drill machine operator, who controls the direction of movement of the drill bit according to the instruction, to ensure that the drill bit advances along a design route.

In today's excavation-free field, the probe can be a very important component. Within the probe, an antenna is configured to transmit as many radio signals as possible with minimum loss of energy. A common probe structure includes an ECU (i.e., electronic control unit), an antenna and a battery, as disclosed in the applicant's Chinese Patent Application No. 201410676654.6, which discloses a probe structure including an antenna, a control circuit board and a battery supplying power to the control circuit board. The antenna can include a magnetic core and a coil which is wound on the outer periphery of the magnetic core and has an extremity connected to the control circuit board. The magnetic core can include multiple magnetic core units, which are made of a magnetic material and bound on an outer side of a peripheral wall of an insulating tube. In the embodiment, the magnetic core units are all insulated from each other. However, in such a probe, the manner of insulation can be complex, and both manufacture and installation can be inconvenient. Hence, there is still room for further improvement.

SUMMARY

A technical problem to be solved by the present disclosure is, in view of the problems in the prior art mentioned above, to provide a probe for an excavation-free guidance instrument which reduces production difficulty and costs.

In an embodiment, a technical solution employed in the present disclosure to solve the abovementioned technical problem is as follows: providing a probe for an excavation-free guidance instrument that can include a casing and a transmitting antenna disposed in the casing, the transmitting antenna including a magnetic core and a coil, characterized in that a magnetic core includes multiple magnetic core segments, the magnetic core segments arranged in sequence in a length direction of the probe, the coil wound on an outer periphery of multiple magnetic cores.

In an embodiment, each magnetic core segment can be a component that is at least one of annular or made of a ferrite, and multiple magnetic core segments can be arranged in sequence in an axial direction.

To facilitate the control of antenna signal transmission, the interior of the casing can be divided into a power supply antenna region and a circuit control region, the transmitting antenna disposed in the power supply antenna region, a control circuit board provided in the circuit control region, and the coil electrically connected to the control circuit board.

To facilitate the supply of power to the control circuit board, a power source, for supplying power to the control circuit board, and a metal tube can be also provided in the power supply antenna region, the metal tube located on an outer periphery of the power source and located on an inner periphery of the transmitting antenna.

To facilitate the connection of the transmitting antenna to the control circuit board, the transmitting antenna can also include a first insulating plastic member, and the coil can have two ends, with the two ends of the coil electrically connected to the control circuit board after being insulated from the metal tube by the first plastic insulating member on a side close to the circuit control region.

In an embodiment, the power source uses a battery, and a metal rotary knob is provided at an end of the metal tube remote from the circuit control region, thereby pressing the battery tightly into the metal tube, and the entire metal tube and the metal rotary knob form a power source negative electrode.

In an embodiment, a second plastic insulating member and a first metal member are provided at an end of the metal tube close to the circuit control region, the first metal member electrically connected to the battery, and the second plastic insulating member disposed between the first metal member and the metal tube. Per the embodiment, the first metal member is thereby isolated from the metal tube by the second plastic insulating member and forms a power source positive electrode.

To make it easier to electrically connect the transmitting antenna and the power source to the control circuit board separately, a second metal member can be provided between the metal tube and the control circuit board, with the power source positive electrode and the power source negative electrode separately electrically connected to the second metal member, and the second metal member electrically connected to the control circuit board.

The probe of the present disclosure can include the following advantages: the magnetic core of the transmitting antenna can be formed by arranging multiple magnetic core segments in sequence in the length direction of the probe, facilitating the manufacture of the magnetic core segments, reducing the disposition of insulating members, facilitating the assembly of the transmitting antenna, and reducing production costs.

DESCRIPTION OF THE ACCOMPANYING DRAWINGS

DETAILED DESCRIPTION

The present disclosure is described in further detail below with reference to the embodiment in the accompanying drawings.

Figure 1:
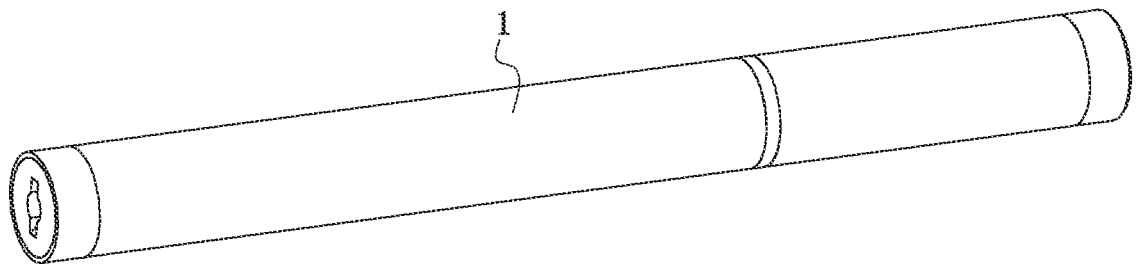
FIG. 1 is a schematic diagram of a probe, in accordance with an embodiment of the present disclosure.
Figure 2:
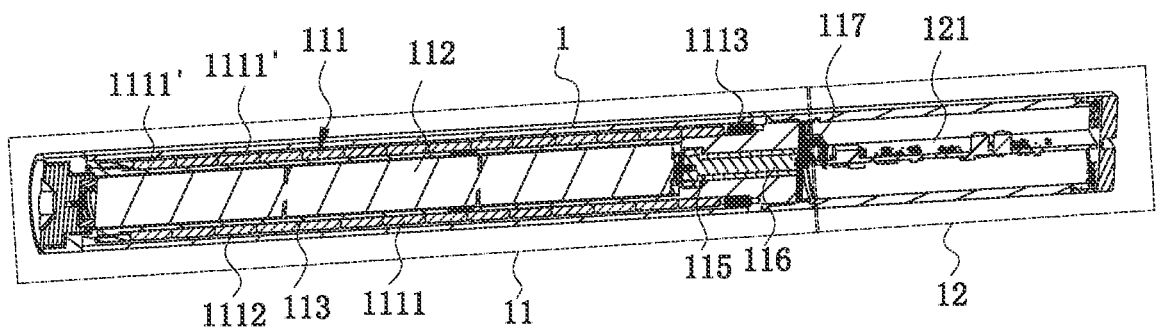
FIG. 2 is a sectional view of a probe, in accordance with an embodiment of the present disclosure.
Figure 3:
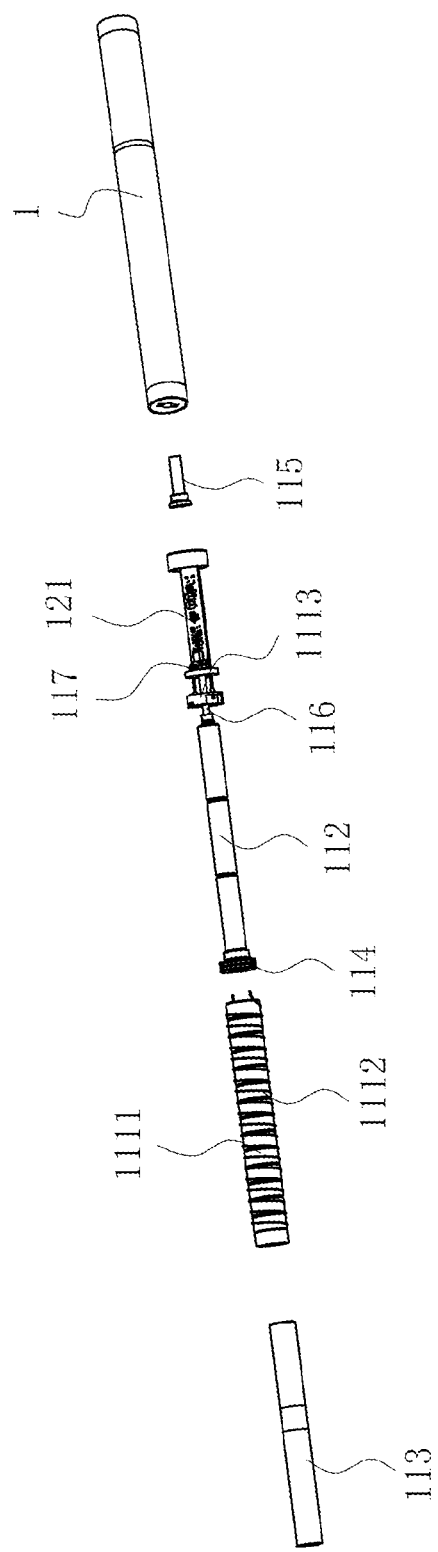
FIG. 3 is an exploded structural schematic diagram of a probe, in accordance with an embodiment of the present disclosure.

Referring to FIGS. 1-3, a probe for an excavation-free guidance instrument, in accordance with an embodiment, can include a casing 1, which is generally cylindrical with the interior of the casing 1 divided into two regions in an axial direction, namely a power supply antenna region 11 and a circuit control region 12, in sequence, where the two regions are arranged adjacently. A control circuit board 121 can be provided in the circuit control region 12; and the control circuit board 121 can be electrically connected to the power supply antenna region 11.

A transmitting antenna 111, a power source 112 and a metal tube 113 can be provided in the power supply antenna region 11, wherein the metal tube 113 can be disposed on an outer periphery of the power source 112, and the metal tube 113 can be located on an inner periphery of the transmitting antenna 111. The transmitting antenna 111 can include a magnetic core 1111 made up of multiple magnetic core segments 1111', a coil 1112 wound on an outer periphery of the magnetic core segments 1111', and a first plastic insulating member 1113. Each magnetic core segment 1111' can be an annular ferrite component, with the multiple magnetic core segments 1111' arranged in sequence in the axial direction (the length direction of the probe). The coil 1112 can be wound on the outer periphery of the multiple magnetic core segments 1111', and two ends of the coil 1112 can be electrically connected to the control circuit board 121 after passing through the first plastic insulating member 1113 (i.e. insulated from the metal tube 113 by the first plastic insulating member 1113) on a side close to the circuit control region 12. With the magnetic core segments 1111' arranged in this way, there may be no need to additionally provide insulating members between the magnetic core segments 1111'. Moreover, the magnetic core segments 1111' with such a structure and shape are can be very easy to manufacture and can also effectively reduce eddy currents, enhance the vibration resistance of the probe, and thereby extend the service life of the probe.

In an embodiment, the metal tube 113 can also be cylindrical, with the interior thereof being hollow and forms forming a battery housing. The power source 112 can incorporate at least one battery. In the illustrated embodiment, three batteries are used, and the batteries are pressed tightly into the battery housing by a metal rotary knob 114 (electrically connected to the batteries) disposed at an end of the metal tube 113 remote from the circuit control region 12. The entire metal tube 113 and the metal rotary knob 114 can form a power source negative electrode. A second plastic insulating member 115 and a first metal member 116 can be provided at an end of the metal tube 113 close to the circuit control region 12, the first metal member 116 electrically connected to the batteries and the second plastic insulating member 115 disposed between the first metal member 116 and the metal tube 113. In such an arrangement, the first metal member 116 is isolated from the metal tube 113 by the second plastic insulating member 115 and forms a power source positive electrode.

A second metal member 117 can be provided between the metal tube 113 and the control circuit board 121. The power source positive electrode and the power source negative electrode can be separately electrically connected to the second metal member 117, in this embodiment being separately screwed tightly to the second metal member 117 by means of screws. The second metal member 117 can be fixed to the control circuit board 121 by soldering, to supply power to the control circuit board 121.

The invention claimed is:

1. A probe for a non-excavation guide, comprising:
an outer casing; and
a transmitting antenna disposed in the outer casing, the transmitting antenna including a magnetic core and a coil, the magnetic core comprising a plurality of magnetic core segments, each magnetic core segment being annular in shape, the magnetic core segments sequentially arranged in a longitudinal direction of the probe, the coil being wound around the plurality of magnetic core segments.

2. The probe of claim 1, wherein each magnetic core segment is comprised of a magnetic material.

3. The probe of claim 2, wherein the magnetic material is a ferrite.

4. The probe of claim 1, wherein the probe defines a probe axis, the plurality of magnetic core segments axially arranged with respect to the probe axis.

5. The probe of claim 1, wherein the outer casing includes a power supply and antenna region and a control circuit region, the transmitting antenna located in the power supply and antenna region, the control circuit region provided with a control circuit board, the coil electrically connected to the control circuit board.

6. The probe of claim 5, wherein the power supply and antenna region are further provided with a power supply for supplying power to the control circuit board and with a metal tube, the power supply defining an outer circumference, the transmitting antenna defining an antenna interior, the metal tube located outside the power supply and inside the transmitting antenna.

7. The probe of claim 6, wherein the transmitting antenna further defines a corresponding inner circumference, the metal tube located on the outer circumference of the power supply and located at the inner circumference of the transmitting antenna.

8. The probe of claim 6, wherein the transmitting antenna further comprises a first plastic insulating member, the coil defining two coil ends, one of the two coil ends being proximate the control circuit region, the coil end proximate the control circuit region insulated from the metal tube by the first plastic insulating member and electrically connected to the control circuit board.

9. The probe of claim 6, wherein the power supply comprises at least one battery, the metal tube having a metal knob, the metal knob disposed at one end of the metal tube away from the control circuit region, the metal knob configured to press the at least one battery into the metal tube, the metal tube and the metal knob comprising a negative pole of the power supply.

10. The probe of claim 6, wherein the power supply comprises at least one battery, the metal tube is adjacent to the control circuit region, the transmitting antenna further comprises a first plastic insulating member, one end of the control circuit region provided with a second plastic insulating member and a first metal member, the first metal member electrically connected to the at least one battery, the second plastic insulating member insulating the first metal member from the metal tube, the first metal member isolated from the metal tube by the second plastic insulating member, the first metal member comprising a positive electrode of the power supply.

11. The probe of claim 1, wherein the power supply comprises at least one battery, each magnetic core segment being annular and thereby defining a hollow core segment interior, the at least one battery disposed within the plurality of the magnetic core segments.

12. A probe for a non-excavation guide, comprising:
an outer casing; and
a transmitting antenna disposed in the outer casing, the transmitting antenna including a magnetic core and a coil, the magnetic core comprising a plurality of magnetic core segments, the magnetic core segments being annular in shape and each thereby defining a hollow segment interior, the magnetic core segments sequentially arranged in a longitudinal direction within the outer casing, the coil located around an outside of the plurality of magnetic core segments.

13. The probe of claim 12, further comprising a power supply, the power supply comprising at least one battery, the at least one battery positioned within the plurality of magnetic core segments.

14. The probe of claim 12, wherein each magnetic core segment is comprised of a ferrite.

15. The probe of claim 12, wherein the probe defines a probe axis, the plurality of magnetic core segments axially arranged with respect to the probe axis.

16. The probe of claim 12, wherein the outer casing includes a power supply and antenna region and a control circuit region, the transmitting antenna located in the power supply and antenna region, the control circuit region provided with a control circuit board, the coil electrically connected to the control circuit board.

17. The probe of claim 16, further comprising a power supply connected to the control circuit board, the power supply comprising at least one battery, the at least one battery positioned within the plurality of magnetic core segments.

18. A probe for a non-excavation guide, comprising:
an outer casing; and
a transmitting antenna disposed in the outer casing, the transmitting antenna including a magnetic core and a coil, the magnetic core comprising a plurality of magnetic core segments, the magnetic core segments sequentially arranged in a longitudinal direction of the probe, each magnetic core segment immediately adjacent at least one other magnetic core segment in the longitudinal direction, the coil being wound around the plurality of magnetic core segments.

19. The probe of claim 18, wherein each magnetic core segment is annular in shape.

\* \* \* \* \*